United States Patent
Lang et al.

(10) Patent No.: US 11,879,992 B2
(45) Date of Patent: Jan. 23, 2024

(54) METHOD FOR IDENTIFYING STATIC RADAR TARGETS USING A RADAR SENSOR FOR MOTOR VEHICLES

(71) Applicant: Robert Bosch GmbH, Stuttgart (DE)

(72) Inventors: Stefan Lang, Benningen (DE); Thomas Gussner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 664 days.

(21) Appl. No.: 17/046,067

(22) PCT Filed: Apr. 27, 2019

(86) PCT No.: PCT/EP2019/060835
§ 371 (c)(1),
(2) Date: Oct. 8, 2020

(87) PCT Pub. No.: WO2020/001828
PCT Pub. Date: Jan. 2, 2020

(65) Prior Publication Data
US 2021/0173043 A1 Jun. 10, 2021

(30) Foreign Application Priority Data
Jun. 30, 2018 (DE) .......................... 102018210814.5

(51) Int. Cl.
*G01S 7/41* (2006.01)
*G01S 13/72* (2006.01)
*G01S 13/931* (2020.01)

(52) U.S. Cl.
CPC .............. *G01S 7/415* (2013.01); *G01S 7/412* (2013.01); *G01S 13/723* (2013.01); *G01S 13/931* (2013.01)

(58) Field of Classification Search
CPC ........ G01S 7/415; G01S 7/412; G01S 13/723; G01S 13/931
See application file for complete search history.

(56) References Cited

U.S. PATENT DOCUMENTS 5,638,281 A * 6/1997 Wang ..................... G01S 7/021
342/29
7,376,247 B2 * 5/2008 Ohta ........................ G06T 7/97
342/55

(Continued)

FOREIGN PATENT DOCUMENTS

CN 104657740 A 5/2015
DE 102014221144 A1 4/2015

(Continued)

OTHER PUBLICATIONS

International Search Report for PCT/EP2019/060835, dated Aug. 5, 2019.

*Primary Examiner* — Peter M Bythrow
(74) *Attorney, Agent, or Firm* — NORTON ROSE FULBRIGHT US LLP

(57) ABSTRACT

A method for identifying and classifying static radar targets with the aid of a radar sensor of a motor vehicle. The method includes: identifying an object as a static radar target based on the received radar signals reflected by the object, generating an occupancy pattern in an occupancy grid based on the received radar signals reflected by the object, storing an assignment, which assigns the generated occupancy pattern to the static radar target, classifying the static radar target as belonging to one or multiple groups of static radar targets based on characteristic features of radar signatures of the received radar signals reflected by the corresponding object. A radar sensor is also described.

6 Claims, 2 Drawing Sheets

(56) References Cited

U.S. PATENT DOCUMENTS

| | | | |
|---|---|---|---|
| 8,063,815 B2 * | 11/2011 | Valo | G06V 20/647 |
| | | | 342/25 R |
| 9,753,130 B2 * | 9/2017 | Takaki | G01S 7/41 |
| 10,488,507 B2 * | 11/2019 | Adachi | G01S 13/931 |
| 11,250,288 B2 * | 2/2022 | Sano | G05D 1/0253 |
| 2005/0270225 A1 * | 12/2005 | Tokoro | G01S 7/4004 |
| | | | 342/55 |
| 2007/0080850 A1 * | 4/2007 | Abe | G01S 13/931 |
| | | | 342/55 |
| 2009/0303026 A1 * | 12/2009 | Broggi | G01S 17/931 |
| | | | 340/435 |
| 2010/0097200 A1 * | 4/2010 | Hilsebecher | G01S 7/412 |
| | | | 702/77 |
| 2011/0074621 A1 * | 3/2011 | Wintermantel | H01Q 1/3233 |
| | | | 342/70 |
| 2012/0130628 A1 * | 5/2012 | Dintzer | G06V 20/58 |
| | | | 701/301 |
| 2014/0035775 A1 * | 2/2014 | Zeng | G06F 18/253 |
| | | | 342/52 |
| 2014/0266860 A1 * | 9/2014 | Blumrosen | G01S 15/89 |
| | | | 367/87 |
| 2015/0109164 A1 * | 4/2015 | Takaki | G01S 13/931 |
| | | | 342/27 |
| 2015/0198711 A1 * | 7/2015 | Zeng | G01S 13/9029 |
| | | | 342/59 |
| 2015/0293216 A1 * | 10/2015 | O'Dea | B60W 40/06 |
| | | | 701/23 |
| 2016/0139262 A1 * | 5/2016 | Staynov | B60W 30/14 |
| | | | 342/52 |
| 2016/0161597 A1 * | 6/2016 | Treptow | G01S 13/424 |
| | | | 342/174 |
| 2016/0378115 A1 * | 12/2016 | Yoo | G01S 17/42 |
| | | | 701/36 |
| 2017/0116487 A1 * | 4/2017 | Yamazaki | G06V 10/44 |
| 2017/0236419 A1 * | 8/2017 | Grewe | G06V 20/582 |
| | | | 340/870.07 |
| 2017/0269201 A1 * | 9/2017 | Adachi | G01S 13/931 |
| 2017/0299717 A1 * | 10/2017 | Hallek | G01S 15/931 |
| 2019/0293759 A1 * | 9/2019 | Shima | G01S 13/584 |
| 2019/0346854 A1 * | 11/2019 | Slutsky | G01S 13/931 |

FOREIGN PATENT DOCUMENTS

| | | | | |
|---|---|---|---|---|
| DE | 102016015405 A1 | | 7/2017 | |
| JP | 2008172441 A | | 7/2008 | |
| JP | 2016529475 A | | 9/2016 | |
| JP | 2019167516 A | | 10/2019 | |
| WO | 2010127650 A1 | | 11/2010 | |
| WO | WO-2010127650 A1 | * | 11/2010 | ........... G01S 13/867 |

* cited by examiner

METHOD FOR IDENTIFYING STATIC RADAR TARGETS USING A RADAR SENSOR FOR MOTOR VEHICLES

FIELD

The present invention relates to a method for identifying and classifying static radar targets with the aid of a radar sensor of a motor vehicle, including identifying an object as a static radar target based on the received radar signals reflected by the object.

BACKGROUND INFORMATION

In driver assistance systems for motor vehicles, for example, in systems for automatic adaptive cruise control or in collision warning systems, radar sensors are frequently used for detecting the traffic surroundings. In addition to dynamic objects, driver assistance systems must also reliably detect static objects as potentially collision-threatening obstacles. However, it is not possible in a single radar measurement to distinguish actual static obstacles from objects able to be driven over such as, for example, manhole covers, empty chip bags or cola cans. Until now, it has been common to observe and classify the radar signature of a static object over time for the purpose of classifying objects as actual static obstacles or as objects able to be driven over. The objects in this case are viewed as punctiform.

Recently, there is an increasing interest in radar sensors that are able to detect significantly more radar reflections for an object with a higher degree of accuracy.

SUMMARY

An object of the present invention is to provide a method for a radar sensor, which allows it to detect static obstacles more reliably.

This object may be achieved according to example embodiments of the present invention.

In accordance with an example embodiment of the present invention, for a static radar target, which is tracked over time and is classified on the basis of radar signatures of the radar reflections assigned to the radar target, an occupancy pattern is also entered into an occupancy grid, the assignment of the occupancy pattern to the radar target being stored. In the process, a radar target is assigned an occupancy pattern that corresponds to one or to multiple radar reflections assigned to the radar target. Thus, the occupancy pattern is linked to the classification of the radar target on the basis of radar signatures of the radar reflections.

The occupancy pattern may specify an occupancy probability for respective grid positions (grid cells). The occupancy grid is stored and updated over time. The radar reflections in the occupancy pattern may be accumulated over time. The expansion of the occupancy pattern allows for an estimation of the expansion of a static obstacle. If a radar target is classified as being able to be driven over, the occupancy pattern may be removed from the occupancy grid in accordance with a setting of the occupancy probability at a value that indicates "not occupied." A similar approach may be taken with vehicles that have driven off. The method may supplement a conventional method for classifying point targets and for detecting actual obstacles.

In accordance with an example embodiment of the present invention, it is particularly advantageous that by assigning an occupancy pattern to an object, it is possible to subsequently carry out for occupancy probabilities entered in an occupancy grid a classification of the underlying object and to link the pieces of information about the occupancy probabilities in the occupancy grid and about the classification to one another, for example, in the course of an approach to the corresponding object.

A multitude of radar reflections assigned to the object may result in the course of an approach to an object, for example, on the order of 100 or more reflections. The assignment of an occupancy pattern to an object, even in the case of a multitude of radar reflections assigned to the object, may enable a simple evaluation of the occupancy pattern for estimating a position of the object and/or for estimating an object size.

The distinction between various groups of static radar targets may further enable radar targets adjacent to one another in the occupancy grid to be distinguished from one another. This enables a better mapping of the surroundings of the motor vehicle. One example is a possible distinction between a guardrail and a neighboring tree. A further example is the distinction between stationary vehicles and other static radar targets.

One particular advantage of the assignment of the occupancy pattern to the object is that with a later estimation of the object as being able to be driven over, it is possible to remove the occupancy pattern from the occupancy grid, since the occupancies in the occupancy grid belonging to the object are known due to the assignment. Thus, a safe removal of occupancy probabilities in the occupancy grid may be enabled. Thus, if in the course of an approach to an obstacle, the obstacle proves able to be driven over, the corresponding occupancy in the occupancy grid may be deleted again. One example is a railway track, for example, in a road, for example, a tramway rail or a railway track at a railway crossing. The railway track represents a static radar target with a wide expansion which, however, may be deleted in the occupancy grid after being classified as being able to be driven over.

Similarly, the occupancy pattern may also be deleted from the occupancy grid in the case of a radar target that has initially been recorded as a static radar target in the occupancy grid, and which is identified as a vehicle beginning to move.

In accordance with an example embodiment of the present invention, it is also advantageous that, based on the occupancy grid, an additional estimation of the expansion of objects is enabled, in particular, of objects that have conventionally been treated as point targets. This enables a reduction of the rate of the false-positive identifications of obstacles.

In the case of larger objects as well having a high number of radar reflections over time, an additional estimation of the expansion based on the occupancy pattern is advantageous, since the occupancy pattern may be much more easily evaluated than the parameters of a large number of radar reflections.

In accordance with an example embodiment of the present invention, it is also advantageous that the occupancy grid nevertheless enables a model-free representation of the static surroundings of the motor vehicle. As a result, the occupancy grid enables versatile applications, for example, for estimating guardrails or for searching for parking spaces. A modeling of the open space in the occupancy grid is also enabled. The modeling of the open space may also be updated by removing occupancy patterns of objects identified as being able to be driven over. The reliability of an occupancy grid may thus be improved.

An object may be identified as a static radar target, in particular, based on an estimation of an absolute velocity of zero, i.e., on a relative velocity that corresponds to the ego velocity of the motor vehicle with an opposite sign.

For example, the occupancy pattern assigned to a static radar target may be stored, for example, in the form of an index of the entries made in the occupancy grid that belong to the occupancy pattern. For example, an identification/identifier (ID) of the static radar target to which the occupancy pattern is assigned may be stored for each grid cell of the occupancy grid that belongs to an occupancy pattern of a static radar target.

An occupancy probability is preferably recorded in a respective grid cell of the occupancy grid.

The occupancy pattern may encompass one or multiple grid cells in the occupancy grid.

The received radar signals reflected by the object may be mapped in one or in multiple grid cells in the occupancy grid, the respective grid cell corresponding to a respective locating position of the received radar signals reflected by the object.

The occupancy grid preferably extends in at least two dimensions. The occupancy grid is preferably a two-dimensional grid, corresponding to an area extending horizontally in the surroundings of the motor vehicle.

For example, radar signatures of received radar signals may be compared with characteristic features and a static radar target may be classified based on the result of the comparison.

The characteristic features used for the classification of the static radar target may, for example, be: azimuth angle, elevation angle, radial distance, relative velocity and/or backscatter properties such as, for example, the radar cross section, as well as combinations of multiple of these features.

In tracking the static radar target over time, it is possible, for example, to update the classification of the static radar target.

Advantageous refinements and embodiments of the present invention are described herein.

Multiple radar reflections originating from different locating positions are combined to form a static radar target based on a spatial proximity of the locating positions, the generated occupancy pattern in the occupancy grid encompassing multiple grid cells, in which the multiple radar reflections are mapped. Thus, it is possible to record multiple radar reflections assigned to the radar target in respective grid cells of the occupancy pattern in the form of occupancy probabilities, the respective grid cells corresponding to respective locating positions of the radar reflections assigned to the radar target.

The present invention also includes a radar sensor for motor vehicles, in which one of the above described methods is implemented.

BRIEF DESCRIPTION OF THE DRAWINGS

An exemplary embodiment is explained in greater detail below with reference to the figures.

DETAILED DESCRIPTION OF EXAMPLE EMBODIMENTS

Figure 1:
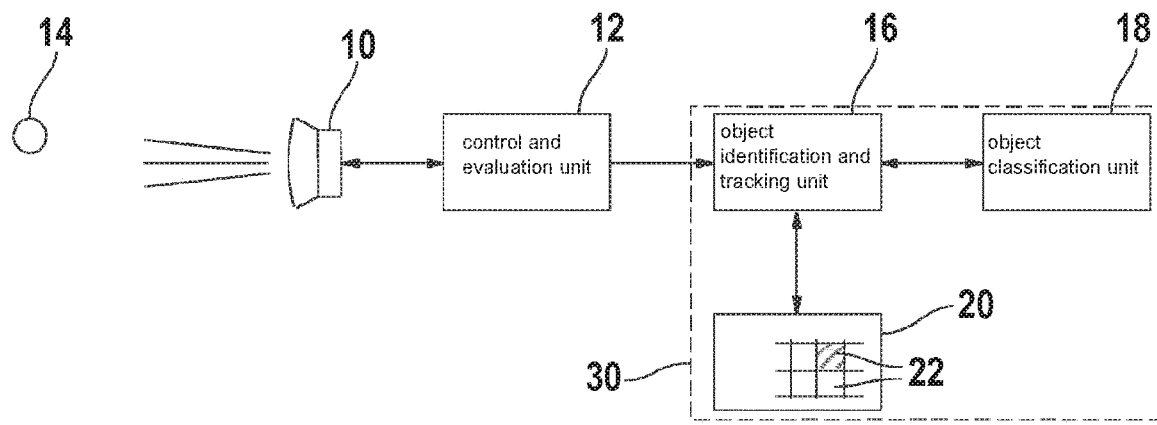
FIG. 1 shows a schematic diagram of a radar sensor, in which the present invention is applicable.

The radar sensor shown in FIG. 1 encompasses a sensor unit 10 including transceiver antennas connected to a control and evaluation unit 12. The latter activates sensor unit 10 in respective measuring cycles for emitting radar signals and for receiving radar signals reflected by objects. The received radar signals are evaluated by control and evaluation unit 12 and parameters of individual radar reflections, i.e., received radar signals reflected on an object 14, are estimated. The estimated parameters of the radar reflections as well as further data of the raw measurements, which may also be referred to collectively as radar signatures, are output to an object identification and tracking unit 16. Object identification and tracking unit 16 combines the radar reflections based on a spatial proximity of locating positions of individual radar reflections at suitably closely coinciding relative velocities, and identifies them as a radar target. This is also referred to as forming clusters or clustering. The identified radar targets are tracked over time (object tracking).

In the event of a radar target identified as static, i.e., a radar target that corresponds to a stationary object, an object classification unit 18 connected to object identification and tracking unit 16 carries out in a first processing procedure a classification of the identified static radar targets based on characteristic features of their radar signatures. A classification may take place, for example, with the aid of a deep-learning approach, for example, with the aid of an artificial neural network. Parameters of the radar reflections used for the classification may be, for example, azimuth angle, elevation angle, radial distance, relative velocity and backscatter properties such as, for example, the radar cross section. Parameters based on multiple radar reflections may also be used for the classification such as, for example, number of radar reflections, arrangement of the reflections, patterns of the arrangement taking the respective backscatter properties of the radar reflections into account. A distinction may, for example, be made in the classification between: objects unable to be driven over (static obstacles) such as stationary vehicles, curbsides, guardrails, signs, traffic light poles, trees and, if necessary objects not further classified; as well as objects able to be driven over.

In a second processing procedure, the estimated parameters of the radar reflections of an identified static radar target are simultaneously entered into an occupancy grid 20 stored in a memory and accumulated over time.

Figure 2:
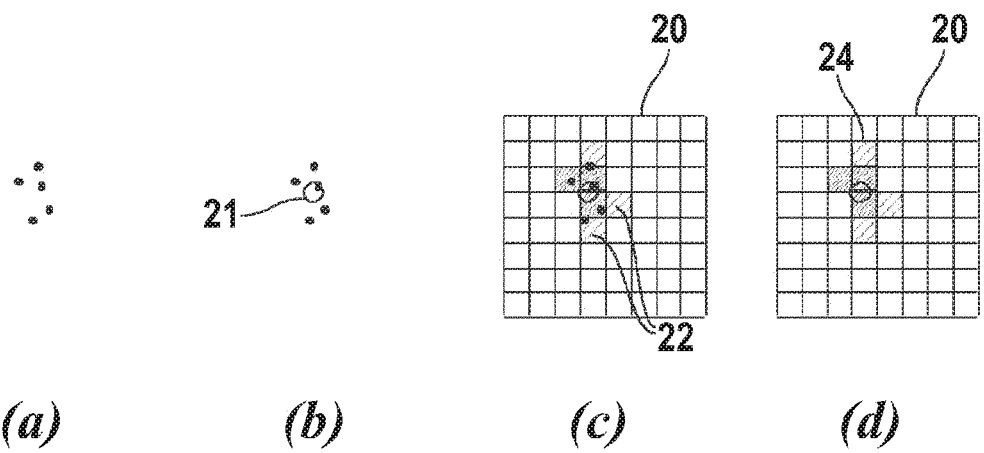
FIG. 2 schematically shows a representation of radar reflections, of an estimated point target and of an occupancy grid.

This is illustrated, for example, in FIG. 2. Occupancy grid 20 maps the identified static surroundings of the motor vehicle. FIG. 2(a) shows locating positions of individual radar reflections. FIG. 2(b) shows a radar target 21 in the form of an estimated point target, which has been estimated based on the individual radar reflections. FIG. 2(c) illustrates how occupancy probabilities of corresponding grid cells 22 of occupancy grid 20 result from the locating positions of the individual radar reflections. The radar reflections are assigned corresponding grid cells, which are characterized as "probably occupied." Various values of occupancy probabilities may be distinguished in the process. Different occupancy probabilities are represented by different markings of grid cells 22. FIG. 2(d) shows obtained occupancy pattern 24 in occupancy grid 20. Occupancy pattern 24 is thus generated by multiple radar reflections assigned to the radar target being recorded in the form of occupancy probabilities in respective grid cells 22 of occupancy pattern 24 corresponding to locating positions of the radar reflections.

An assignment between occupied grid cells 22 of occupancy pattern 24 and the relevant radar target is also stored. For example, the occupancy probability and an object identification (ID) that identifies the associated radar target may be stored in each relevant grid cell 22. Alternatively or in addition, object identification and tracking unit 16 may store occupancy pattern 24 in the form of an index of grid cells 22, which are assigned to the radar target.

Occupancy grid 20 is designed to store relevant occupancy patterns 24 for multiple detected static radar targets, the assignments in each case also being stored.

Object identification and tracking unit 16 is configured to estimate for a radar target the expansion of the radar target based on assigned occupancy pattern 24. The expansion may, for example, be determined corresponding to occupied grid cells 22 of occupancy pattern 24. The expansion thus estimated may be incorporated as an additional parameter of the radar target into the classification of the radar target by object classification unit 18.

If, during the tracking of a static radar target, in particular, of a point target, the radar target proves not to be a relevant obstacle but is (re-)classified as being able to be driven over, then object identification and tracking unit 16 is configured to delete the assigned occupancy pattern 24 in occupancy grid 20 based on the assignment of occupancy pattern 24 to the static radar target. One example thereof is an object in the form of a manhole cover. Thus, occupancy grid 20 invariably maps only static radar targets classified as potential objects with no artefacts due to an eliminated classification of a static radar target as an obstacle remaining in occupancy grid 20.

If during the tracking of a static radar target, the radar target proves to be set in motion, then object identification and tracking unit 16 is configured to delete assigned occupancy pattern 24 in occupancy grid 20 based on the assignment of occupancy pattern 24 to the radar target. Thus, occupancy grid 20 invariably maps only radar targets identified as static with no artefacts due to an eliminated classification of a radar target as a static radar target remaining in occupancy grid 20.

If during the tracking of two or more static radar targets these prove to belong to one single object, then object identification and tracking unit 16 is configured to merge occupancy patterns 24 into one unified occupancy pattern 24 of a radar target based on the assignments of occupancy patterns 24 to the radar targets.

Object identification and tracking unit 16 including occupancy grid 20 and object classification unit 18 are, for example, part of a driver assistance system 30.

Figure 3:
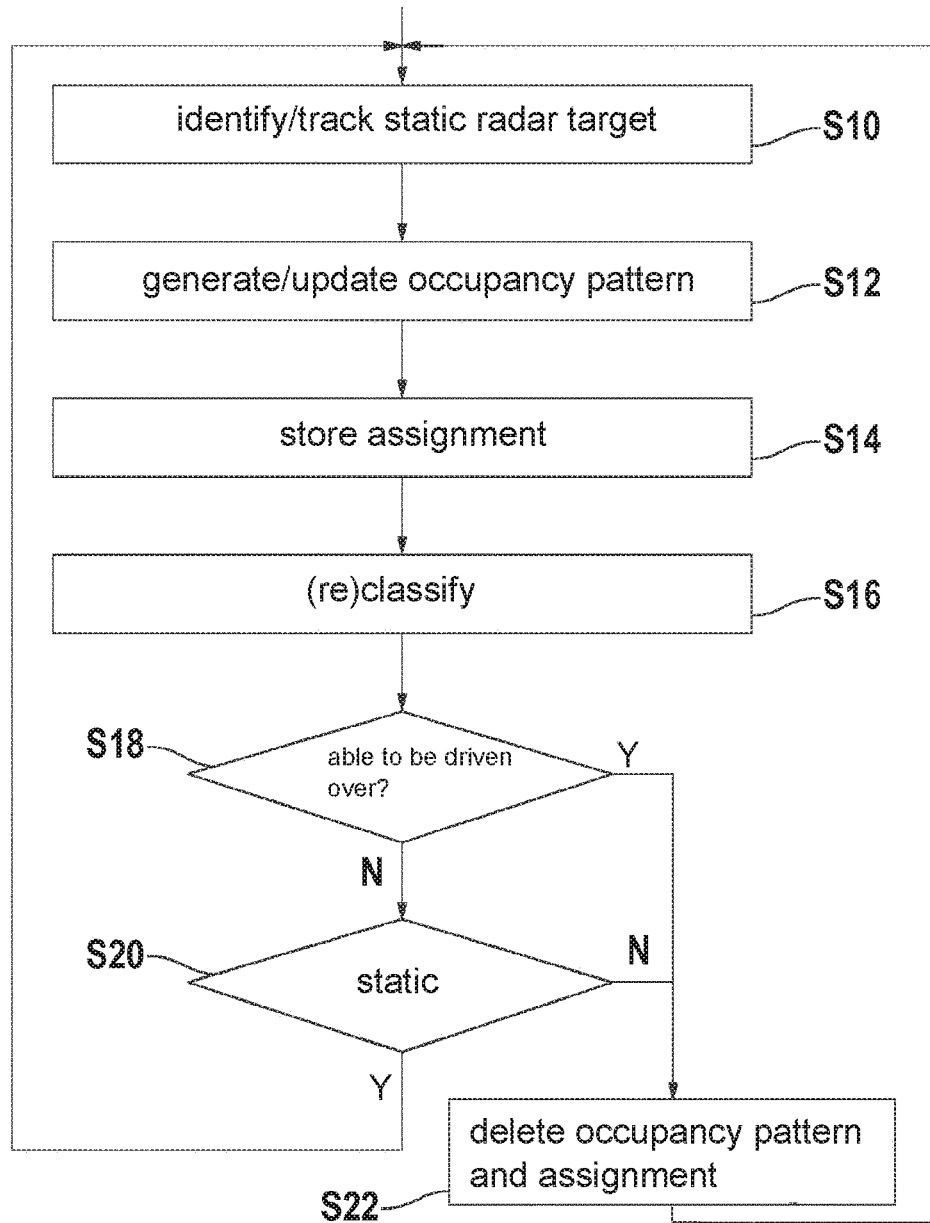
FIG. 3 shows a flowchart of a method for identifying and classifying static radar targets in accordance with an example embodiment of the present invention.

The method shown in FIG. 3 may be implemented in the described radar sensor and is described below. In a step S10, at least one object 14 is identified as a static radar target based on the received radar signals reflected by object 14. In step S12, respective occupancy pattern 24 is generated in occupancy grid 20 based on the received radar signals reflected by respective object 14. In step 14, an assignment is stored, which assigns generated occupancy pattern 24 to the static radar target. In step S16, the above-described classification of the static radar target takes place.

The classification (step S16) may take place in parallel to, prior to, or subsequently to the generation of the occupancy pattern (step S14).

In step S18, it is checked whether a radar target has been classified as being able to be driven over. If yes, the occupancy pattern and the stored assignment are deleted in step S22. The method is then continued with step S10 of identifying and tracking other radar targets.

If no, it is checked in step S20 whether the radar target is still identified as a static radar target. If yes, the method is repeated, the radar target being further tracked in step S10 and the occupancy pattern being updated in step S12 via accumulation of the radar reflections assigned to the radar target. Otherwise, if, i.e., the radar target is identified as being in motion, the occupancy pattern and the stored assignment are deleted in step S22. The method is then repeated again with step S10 of identifying and tracking other radar targets.

The described steps may be carried out in each case for all identified radar targets.

What is claimed is:

1. A method for identifying and classifying static radar targets using a radar sensor of a motor vehicle, the method comprising the following steps:
   obtaining a plurality of radar signals;
   based on parameters of the radar signals, determining that the plurality of radar signals are reflected by a same object;
   based on the determination, generating, in an occupancy grid an occupancy pattern, formed of a combination of a subset of cells of the occupancy grid, corresponding to the object based on the plurality of radar signals that have been determined to have been reflected by the same object, the pattern being formed by an association of each cell of the subset of cells with a same identification (ID) corresponding to the object;
   subsequent to the generating of the occupancy pattern in the occupancy grid, classifying the object as being at least one of (a) a non-static radar target and (b) a traversable radar target, the classifying being based on characteristic features of radar signatures of a portion of the plurality of radar signals reflected by a part of the object; and
   based on the classification, removing from the occupancy grid an entirety of the occupancy pattern due to the correspondence of the occupancy pattern to the object.

2. The method as recited in claim 1, the method further comprising the following step:
   tracking the object over time based on received radar signals of multiple measuring cycles of the radar sensor reflected by the object, wherein the classification being performed using received radar signals from the multiple measuring cycles of the radar sensor reflected by the object.

3. The method as recited in claim 1, the method further comprising the following steps:
   tracking the object over time based on received radar signals of multiple measuring cycles of the radar sensor reflected by the object; and
   accumulating occupancy probabilities in the cells based on the received radar signals of the multiple measuring cycles of the radar sensor.

4. The method as recited in claim 1, wherein the occupancy pattern is used as a basis for making the classification.

5. The method as recited in claim 1, wherein the parameters upon which the determination is made include a spatial proximity of locating positions from which the plurality of radar signals are reflected.

6. A radar sensor for motor vehicles, comprising:
a memory for storing an occupancy grid which corresponds to an area in surroundings of the motor vehicle; and
at least one processor, wherein the at least one processor, in combination, is configured to:
  obtain a plurality of radar signals;
  based on parameters of the radar signals, determine that the plurality of radar signals are reflected by a same object;
  based on the determination, generate, in the occupancy grid an occupancy pattern, formed of a combination of a subset of cells of the occupancy grid, corresponding to the object based on the plurality of radar signals that have been determined to have been reflected by the same object, the pattern being formed by an association of each cell of the subset of cells with a same identification (ID) corresponding to the object;
  subsequent to the generation of the occupancy pattern in the occupancy grid, classify the object as being at least one of (a) a non-static radar target and (b) a traversable radar target, the classifying being based on characteristic features of radar signatures of a portion of the plurality of radar signals reflected by a part of the object; and
  based on the classification, removing from the occupancy grid an entirety of the occupancy pattern due to the correspondence of the occupancy pattern to the object.

* * * * *